United States Patent

[11] 3,634,112

[72] Inventors Paul J. Yavorsky
 Wyckoff;
 Louis S. Cook, Ridgewood, both of N.J.
[21] Appl. No. 719,843
[22] Filed Apr. 9, 1968
[45] Patented Jan. 11, 1972
[73] Assignee Basic Ceramics Incorporated
 Hawthorne, N.J.

[54] ALUMINUM POLYOXYCHLORIDE BONDED CASTABLE REFRACTORY
 11 Claims, No Drawings
[52] U.S. Cl..................................................... 106/55,
 106/57, 106/62, 106/65, 106/67
[51] Int. Cl..................................................... C04b 35/10,
 C04b 35/48
[50] Field of Search........................................... 106/65, 55,
 57, 62, 67

[56] References Cited
UNITED STATES PATENTS
2,818,345 12/1957 Vickers et al................. 106/65
FOREIGN PATENTS
924,510 4/1963 Great Britain Primary Examiner—James E. Poer
Attorney—Oberlin, Maky, Donnelly & Renner ABSTRACT: A refractory ceramic composition suitable for use as a castable refractory consisting essentially of a slurry of ceramic particles admixed with an aluminum polyoxychloride bonding agent. The bonding agent is the reaction product of aluminum polyoxychloride and a curing agent which is capable of supplying alkalinizing ions to the aluminum polyoxychloride. Such composition may be cast into a mold and permitted to harden in the mold. The casting is subsequently removed from the mold.

ALUMINUM POLYOXYCHLORIDE BONDED CASTABLE REFRACTORY

This invention relates generally as indicated to an aluminum polyoxychloride bonded castable refractory, and more particularly to a refractory ceramic composition and process for the production of such castable refractories.

The use of various metallic salts as binders for ceramic powders and aggregates is, of course, widely known, and many compositions and applications for this have been proposed. Such metallic salts are believed to form a film about the ceramic particles, thereby tightly bonding the particles together. To effect such bonding, however, the salt solutions must have substantially all of their water of solution removed either by an evaporation or a diffusion process, which is obviously a significant disadvantage.

In more recent times, it has been proposed to bond ceramic particles with complex polymerizable salts, which form gels upon polymerization and impart some plasticity and pliability to the ceramic article. Polymerizable salts also tend to provide higher strengths throughout their temperature ranges of decomposition. The polymerizable salts, however, likewise must have their water of solution removed before gelation occurs or must be heated to induce gelatin.

One such polymerizable salt which has been used as a binder for ceramic powders and aggregates is aluminum polyoxychloride. At present, however, the use of this salt is limited to fabrication techniques which can provide for dehydration while the shaped article is confined in the mold, or to techniques in which the ceramic article can be shaped from a powder or aggregate bearing the aluminum polyoxychloride salt with a reduced amount of water so that the formed shape may be removed from the mold as in dry pressing or extrusion.

It is thus highly desirable to have a process and a composition whereby a castable refractory can be prepared without the necessity of removing the water of solution of the bonding agent or applying heat externally to produce bonding. Accordingly, it is a principal object of the present invention to provide such a process and composition.

A further object of the present invention is the provision of a process and composition whereby an aluminum polyoxychloride bonding agent can be hardened in situ while bearing all of its originally contained water.

Yet another object of this invention is the provision of a ceramic composition which can be formed into a castable refractory which is capable of hardening hydraulically while still confined and containing all of the tempering water.

It is an additional object of this invention to provide a process and a composition whereby nonpermeable mold casting of alumina and other ceramic materials may be achieved.

Other objects, features, and advantages of this invention will become apparent to those skilled in the art after a reading of the following more detailed description.

These and other objects are achieved by this invention in which a refractory ceramic composition suitable for use as a castable refractory is provided in which the ceramic particles are bonded with an aluminum polyoxychloride bonding agent. It has been found that the polymerization of aluminum polyoxychloride with a curing agent, as will be explained more fully hereinafter, enables such a composition to be cast into a mold and hardened in the mold without removal of water or the application of external heat.

As suggested by the foregoing, any of the usual ceramic materials may be used as aggregates in this invention, such as alumina, mullite, zirconia, magnesium aluminates, beryllia, cordierite, dumorterite, pyrophyllite, etc., and additionally, calcined clay, silicate aggregates, carbides, silicides, nitrides, borides and metal powders and grits may be used. In general, the commonly used ceramic materials such as alumina, mullite, and zirconia are presently preferred.

The aluminum polyoxychloride suitable for use in this invention can be generally any of those commercially available, as for example that produced by Cawood Wharton & Co. Limited under the trade designation 5035. Additionally, the aluminum polyoxychloride can be prepared by the reaction of a reactive aluminum hydrate, aluminum hydroxide, or colloidal alumina with an acidic solution such as hydrochloric acid or aluminum trichloride. In general, any aluminum polyoxychloride can be used irrespective of its method of preparation, although the composition preferably will have little or no free chloride ions.

As a curing agent for the aluminum polyoxychloride, many compounds are suitable. Generally, any basic material which is capable of supplying alkalinizing ions to the aluminum polyoxychloride to cause the same to polymerize and gel is suitable, with the choice of a specific material being dependent upon the rate of solution and subsequent dissociation in the aluminum polyoxychloride medium and this is in turn dependent upon the particle size and purity of the curing agent. Illustrative examples of such compounds are the oxides, carbonates, hydroxides, silicates, alumino-silicates and phosphates of magnesium, calcium, barium, strontium, lanthanum, yttrium, and lithium. Magnesium oxide is in general the preferred such curing agent and more particularly a fused or dead-burned magnesium oxide. Additional specific examples of suitable curing agents are the following: tribasic calcium phosphate, dolomite, magnesium trisilicate, manganous carbonate, zinc oxide, lithium metasilicate, synthetic spodumene, magnesite, samarium oxide, sodium phosphate, calcium titanate, magnesium zirconate, calcium zirconate, and calcium disilicate.

To prepare the ceramic binder composition of this invention, a solution (it will be understood by those skilled in the art that a solution, gel, sol, or slurry may be formed depending on the degree of reaction and ratio of the reactants, and hence such term is intended to be generic to all such forms and to differentiate this fluid from the aggregate-binder fluidized mixture) of aluminum polyoxychloride in water may first be prepared. To prepare such a solution approximately 60 to about 80 weight percent of aluminum polyoxychloride will be added to 40 to 20 percent of water. Such solution is then a vehicle with which to wet the aggregate with any of the above-described curing agents which are capable of supplying alkalinizing ions to the aluminum polyoxychloride. In general, approximately 0.5 to about 1.5 weight percent of curing agent, based on the aggregate weight, is used, although the exact amount is dependent on the amount of vehicle and the amount of hydroxyl donors supplied by the curing agent. The usual bonding quantity of aluminum polyoxychloride solution which will be used generally is from approximately 10 to about 30 weight percent, based on the weight of the ceramic aggregate.

The rate of polymerization is controllable by the degree of slurry dilution, by the quantity of the curing agent in the slurry and also by the particle size, the density and chemical inertness of the curing agent. In general, it has been found that a useful working life, viz, the time from mixing to thickening, can be provided by using a curing agent having a particle size of from approximately 150 microns to about 10 microns. For example, when fused magnesia is employed as the curing agent, it has been found that particle sizes of 44 microns to 10 microns provide a working time of approximately 10 to 15 minutes; a particle size of from 75 microns to 44 microns provides a working time of about one-half hour; and a particle size of 150 microns to 75 microns provides at least 1 hour of working time.

One specific example of a method of preparing the aluminum polyoxychloride binder "solution" is as follows. Dry blend 80 grams of aluminum hydrate assaying 75 percent $Al_2O_3$ with 20 grams of aluminum trichloride of molecular weight 133.4; to the above blend, stir in 200 grams of water slowly to avoid steam generation. The "solution" is then aged overnight or until it becomes transparent. This 300 grams of "solution" may be hardened with 23 grams of −200 +325 mesh fused magnesia of 99.5% MgO content or nominally 7.7% MgO.

Thus, an aggregate mixture which requires 10 percent binder "solution" to become fluid requires the incorporation of (7.7%) times (10%) MgO, or nominally three-fourths percent of the aggregate weight, to induce hydraulic hardening.

In another method of preparing the aluminum polyoxychloride binder "solution," 160 grams of aluminum hydrate is dry blended with 20 grams of aluminum trichloride. Two hundred grams of water is then added and aged. This "solution" will not become transparent, but will remain as a slurry, being a mixture of the solution noted plus 50 percent excess aluminum hydrate. The aluminum hydrate becomes activated by absorption of the excess chloride present and serves as an additional binder. This 380 grams of "solution" still requires only 23 grams or 6.1 percent of magnesia to hydraulically harden the mass.

However, the same aggregate mixture as that noted above would require about 18 percent of this polyoxychloride "solution" to fluidize it. The magnesia requirement would then be (18 percent) times (6.1 percent) or 1.1 percent of the aggregate weight to hydraulically harden the mass.

There are many variations of this reaction whereby the aluminum hydroxide may be supplied by boehmite, bauxite, and various other aluminum hydrates. In like manner the chloride may be supplied by hydrochloric acid or other chloride donor.

The aggregate-binder solution slurry may then be cast into a mold of desired configuration. As noted previously, nonpermeable molds may be used, such as steel, plastic, etc.; any of the usual porous molds may also be used if desired. After the slurry has been cast into the mold, it is permitted to harden in the mold, and it is not necessary to remove water of solution or to apply external heat to effect such hardening. After the article has hardened, it is, of course, removed from the mold.

In addition to the above procedure, the ceramic particles may first be admixed with the powdered curing agent and the aforenoted aluminum polyoxychloride solution subsequently admixed with the curing agent—ceramic admixture to effect further polymerization and gelation of the aluminum polyoxychloride. The slurry resulting from this is then ready to be cast into a mold, hardened and removed as described above.

Other procedures may also be followed for forming the ceramic composition. For example, the aluminum polyoxychloride may be partially dehydrated and mixed with the ceramic particles, after which such admixture may be combined with the powdered curing agent and wetted with plain or acidulated water. Alternatively, the aluminum polyoxychloride can be formed in situ by the use of finely divided boehmite or bauxite, which readily convert to aluminum polyoxychloride in the presence of a chloride ion donor. Such a batch could also bear a previously treated boehmite or bauxite which has been partially reacted with hydrochloric acid, or a hydratable alumina can be reacted with a hydrochloric acid or aluminum trichloride solution to at least partially form the aluminum polyoxychloride.

The invention will be better understood by reference to the following illustrative examples.

EXAMPLES 1–8

In these examples, the quantities of the ceramic materials shown in the following tables were dry tumbled for approximately one-half hour to ensure uniform blending. The dry mix was then wetted with the indicated amounts of aluminum polyoxychloride bonding solution which was prepared by mixing 2 parts of the aforenoted Cawood Wharton 5035 aluminum polyoxychloride with 1 part of water.

The slurries of ceramic particles and bonding agent were thereafter cast into cylindrical steel molds into which protruded a solid rubber core to within about 0.25 inch of the open top of the mold. The cylinder and core were affixed to a "Formica" covered plywood base so that a 0.25-inch concentric gap was formed between the mold and the rubber core. The castings were allowed to stand without moving with the progress of the setting times being noted at regular intervals. The setting times are shown in the tables for each of the examples. After the castings had hardened, the base of the mold was removed and the cast shape was subsequently removed from the shell.

TABLE 1

| Material | U.S. Standard Sieve Size | Wt. % |
| --- | --- | --- |
| Fused mullite | − 8 + 14 | 10 |
| Fused mullite | − 14 + 30 | 15 |
| Fused mullite | − 30 + 50 | 15 |
| Fused mullite | − 50 + 100 | 20 |
| Fused mullite | −100 | 20 |
| Fused mullite | −270 | 10 |
| Milled calcined china clay | −325 | 5 |
| Edgar plastic kaolin | −325 | 5 |
| Fused magnesia | −200 + 325 | 0.75 |
| AlOCl Bonding solution | | 12.5 cc. |
| Setting time—2 hours | | |

TABLE 2

| Material | U.S. Standard Sieve Size | Wt. % |
| --- | --- | --- |
| Fused mullite | − 4 + 8 | 10 |
| Fused mullite | − 8 + 14 | 10 |
| Fused mullite | − 14 + 30 | 13 |
| Fused mullite | − 30 + 50 | 13 |
| Fused mullite | − 50 + 100 | 18 |
| Fused mullite | −100 | 18 |
| Tabular alumina | −325 | 18 |
| Fused magnesia | −200 + 325 | 0.75 |
| AlOCl Bonding solution | | 13 cc. |
| Setting Time—2 hours | | |

TABLE 3

| Material | U.S. Standard Sieve Size | Wt. % |
| --- | --- | --- |
| Calcined mullite | − 8 + 14 | 10 |
| Calcined mullite | − 14 + 30 | 15 |
| Calcined mullite | − 30 + 50 | 15 |
| Calcined mullite | − 50 + 100 | 20 |
| Calcined mullite | −100 | 20 |
| Tabular alumina | −325 | 20 |
| Fused magnesia | −325 | 0.75 |
| AlOCl Bonding solution | | 15 cc. |
| Setting Time—1.1 hours | | |

TABLE 4

| Material | U.S. Standard Sieve Size | Wt. % |
| --- | --- | --- |
| Calcined zircon | − 8 + 14 | 10 |
| Calcined zircon | − 14 + 30 | 15 |
| Calcined zircon | − 30 + 50 | 15 |
| Calcined zircon | − 50 + 100 | 20 |
| Calcined zircon | −100 | 20 |
| Milled zircon | −325 | 9 |
| Zircon | 2 Micron | 9 |
| Fused magnesia | −325 | 0.75 |
| AlOCl Bonding solution | | 16 cc. |
| Setting Time—1.2 hours | | |

TABLE 5

| Material | U.S. Standard Sieve Size | Wt. % |
| --- | --- | --- |
| Calcined MgO-Al$_2$O$_3$ Spinel | − 8 + 14 | 10 |
| Calcined MgO-Al$_2$O$_3$ Spinel | − 14 + 30 | 15 |
| Calcined MgO-Al$_2$O$_3$ Spinel | − 30 + 50 | 15 |
| Calcined MgO-Al$_2$O$_3$ Spinel | − 50 + 100 | 20 |
| Calcined MgO-Al$_2$O$_3$ Spinel | −100 | 20 |

| Material | U.S. Standard Sieve Size | Wt. % |
| --- | --- | --- |
| Alumina | −325 | 9 |
| Calcined spinel | −325 | 9 |
| Fused magnesia | −200 + 325 | 0.75 |
| AlOCl Bonding solution | | 15 cc. |
| Setting Time— 2.1 hours | | |

TABLE 6

| Material | U.S. Standard Sieve Size | Wt. % |
| --- | --- | --- |
| Fused zirconia | − 8 + 14 | 10 |
| Fused zirconia | − 14 + 30 | 15 |
| Fused zirconia | − 30 + 50 | 15 |
| Fused zirconia | − 50 + 100 | 20 |
| Fused zirconia | −100 | 20 |
| Fused zirconia | −325 | 12 |
| Low calcined zirconia | −325 | 8 |
| Fused magnesia | −200 + 325 | 0.75 |
| AlOCl Bonding solution | | 9 cc. |
| Setting Time—1.6 hours | | |

TABLE 7

| Material | U.S. Standard Sieve Size | Wt. % |
| --- | --- | --- |
| Calcined beryllia | − 30 + 50 | 20 |
| Calcined beryllia | − 50 + 100 | 20 |
| Calcined beryllia | −100 | 40 |
| Calcined beryllia | −325 | 15 |
| Low calcined beryllia | −325 | 5 |
| Fused magnesia | −200 + 325 | 0.50 |
| AlOCl Bonding solution | | 18 cc. |
| Setting Time—2.2 hours | | |

TABLE 8

| Material | U.S. Standard Sieve Size | Wt. % |
| --- | --- | --- |
| Calcined alumina | − 8 + 14 | 10 |
| Calcined alumina | − 14 + 30 | 15 |
| Calcined alumina | − 30 + 50 | 15 |
| Calcined alumina | − 50 + 100 | 20 |
| Calcined alumina | −100 | 20 |
| Tabular alumina | −325 | 18 |
| Dead-burned magnesia | −325 | 0.75 |
| AlOCl Bonding solution | | 14 cc. |
| Setting Time—1.0 hours | | |

EXAMPLE 9

The following ceramic composition was intimately mixed for approximately one-half hour to ensure a uniform blend.

| | | | |
| --- | --- | --- | --- |
| − 30 + 50 | fused alumina | 20% by wt. | |
| − 50 + 100 | fused alumina | 20% by wt. | |
| −100 | fused alumina | 40% by wt. | |
| −325 | fused alumina | 20% by wt. | |

A 10 percent aluminum polyoxychloride—90 percent boehmite slurry was also prepared and approximately 0.6 weight percent of −200 +325 mesh fused magnesium oxide was added thereto. The above mixture was subsequently slurried with approximately 10 percent water and vibration cast into a polyethylene mold. The casting had hardened sufficiently to permit removal from the mold in approximately one-half hour.

The reasons for the success of the present invention are not clearly understood, but it is believed that the reaction of aluminum polyoxychloride with the alkalinizing curing agent in the presence of water further polymerizes the aluminum oxychloride to form as a polymer bond, AlO—Cl—OAl, (the basic cation of the curing agent combining with a chloride ion of the aluminum polyoxychloride) which provides a strong bond among the ceramic particles and hence articles of high strength.

Although the present invention has been described with regard to ceramic compositions for the formation of castable refractories, such composition may also be used as a self-setting cement or a mortar composition if desired.

Other modes of applying the principle of the invention may be employed, change being made as regards the details described, provided the features stated in any of the following claims, or the equivalent of such, be employed.

We, therefore, particularly point out and distinctly claim as our invention:

1. A refractory ceramic composition suitable for mold casting consisting essentially of a slurry of ceramic aggregate admixed with an aluminum polyoxychloride bonding agent, said bonding agent consisting essentially of, based on the weight of the ceramic aggregate, the reaction product of about 10 percent to about 30 percent by weight aluminum polyoxychloride solution and at least about 0.5 percent by weight inorganic curing agent capable of supplying alkalinizing ions to said aluminum polyoxychloride to gel the same.

2. The ceramic composition of claim 1 in which said bonding agent includes approximately 0.5 to about 1.5 percent by weight curing agent, the curing agent having a particle size between about 10 microns and about 150 microns.

3. The composition of claim 2 in which said curing agent is magnesium oxide.

4. The refractory composition of claim 2 in which said ceramic aggregate is of the class consisting of alumina, mullite and zirconia.

5. The ceramic composition of claim 1 in which said aluminum polyoxychloride is the reaction product of aluminum hydrate and an acidic solution selected from the group consisting of aluminum chloride and hydrochloride acid, the aluminum polyoxychloride containing excess aluminum hydrate.

6. The method of making a ceramic article including the steps of
    admixing a ceramic aggregate material with at least about 0.5 weight percent inorganic curing agent based on the weight of the aggregate material;
    adding to said mixture to form a slurry about 10 percent to about 30 percent by weight, based on the weight of the mixture, of an aluminum polyoxychloride solution, said curing agent being capable of supplying alkalinizing ions to the solution to gel the same;
    casting the resulting slurry into a mold;
    allowing the same to harden in such mold and subsequently removing the casting therefrom.

7. The method of claim 6 in which said aluminum polyoxychloride solution comprises aluminum polyoxychloride and water in the ratio of about 60 to about 80 weight percent aluminum polyoxychloride to about 40 to about 20 weight percent water.

8. The method of claim 6 in which said curing agent is magnesium oxide, said aggregate being of the class consisting of alumina, mullite, and zirconia.

9. The method of claim 6 in which said curing agent is selected from the group consisting of the oxides, carbonates, hydroxides, silicates, alumino-silicates and phosphates of magnesium, calcium, barium, strontium, lanthanum, yttrium, and lithium.

10. The method of claim 9 in which the weight percent curing agent employed is between about 0.5 and about 1.5, the curing agent having a particle size between about 10 microns and about 150 microns.

11. A refractory ceramic composition in slurry form suitable for mold casting consisting essentially of a ceramic aggregate, about 0.5 to about 1.5 weight percent, based on the weight of the ceramic aggregate, of an inorganic curing agent selected from the group consisting of the oxides, carbonates, hydroxides, silicates, alumino-silicates, and phosphates of magnesium, calcium, barium, strontium, lanthanum, yttrium, and lithium; and about 10 percent to about 30 percent by weight, based on the weight of the ceramic aggregate, of an aluminum polyoxychloride solution, said solution comprising aluminum polyoxychloride and free water in the ratio of about 60 to about 80 weight percent aluminum polyoxychloride to about 40 to about 20 weight percent water, said curing agent being capable of supplying alkalinizing ions to said aluminum polyoxychloride to gel the same.

* * * * *